July 19, 1960  U. TUCHEL  2,946,035
COUPLINGS FOR ELECTRIC CONDUCTORS
Filed Feb. 9, 1955  2 Sheets-Sheet 1
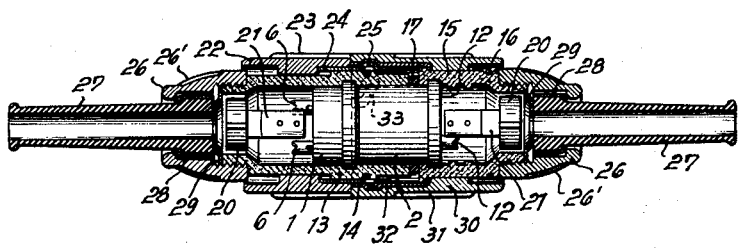
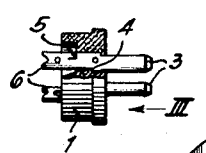
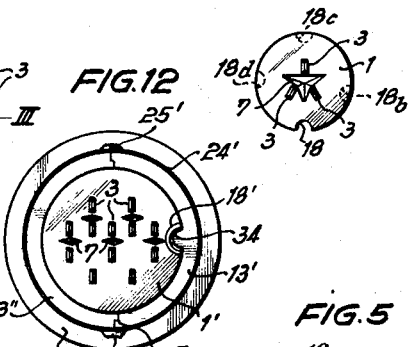
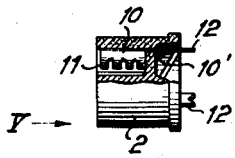
INVENTORS:
ULRICH TUCHEL July 19, 1960   U. TUCHEL   2,946,035
COUPLINGS FOR ELECTRIC CONDUCTORS
Filed Feb. 9, 1955   2 Sheets-Sheet 2
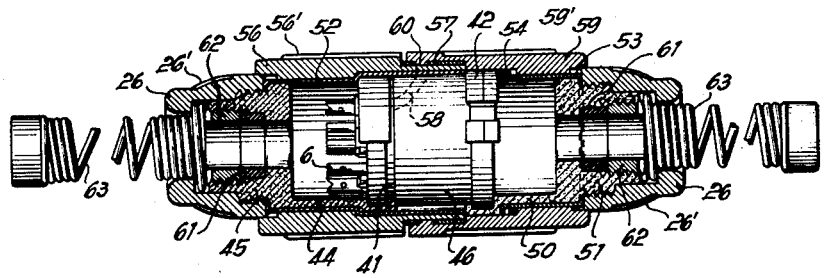
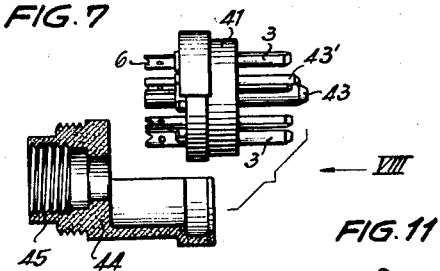
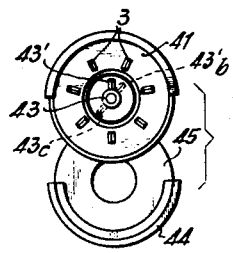
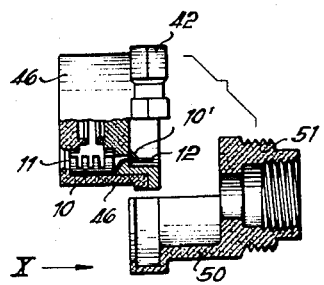
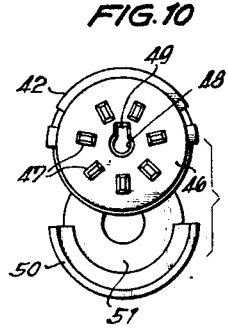
INVENTORS:
ULRICH TUCHEL
BY *heon M. Strauss*
AGT United States Patent Office 2,946,035
Patented July 19, 1960

2,946,035
COUPLINGS FOR ELECTRIC CONDUCTORS
Ulrich Tuchel, Bismarckstr. 107, Heilbronn (Neckar), Germany
Filed Feb. 9, 1955, Ser. No. 487,186
Claims priority, application Germany Mar. 28, 1950
5 Claims. (Cl. 339—89)

This invention relates to couplings for electric cords, cables, and like conductors, and especially to multi-terminal or multi-polar couplings.

It is an object of the present invention to provide means affording the construction of novel and improved coupling members which, when connected to one another, will be securely maintained in locked relation by means of a resilient force acting axially of said members.

It is another object of the present invention to provide means facilitating coupling of electric cords, cables, and like conductors in a simplified, yet highly efficient manner regardless of the number of wires incorporated in said conductors and without possibility of misalignment of the respective terminals of the various conductors.

It is still another object of the present invention to provide means conducive to effective couplings for electric cords, cables, and like conductors, the members of said couplings being constructed of a minimum number of parts which are easily assembled and dismantled without recourse to auxiliary fasteners and tools for manipulating such fasteners.

Yet another object of the present invention is to provide means presenting extremely compact and lightweight coupling structures for electric cords, cables, and like conductors, which structures are facilely manipulatable with utmost safety for the conductors and the operator and are sufficiently sturdy to withstand rigorous and continued use without substantial wear and tear.

It is a further object of the present invention to provide means enabling the use of various and different terminal supporting members with each coupling member of a coupling device for electric cords, cables, and like conductors, whereby said coupling device may be adapted to conductors designed in different manners (as regards the number of individual wires) or for different voltage or current handling capacities by means of a simple replacement of one terminal supporting member by another such member having the desired terminal pattern and construction.

In general, the invention includes a construction of couplings for electric cords, cables, and like conductors in which the members having the respective terminals mounted therein are inserted between pairs of shell-like members which in turn are held together by external sleeves surrounding each of said pairs of shell-like members. The outer sleeves, which are freely rotatable on said shell-like members, are provided with a plurality of pins or tongues and helical slots, respectively, constituting bayonet locking means. Locking of the coupling members is effected by rotation of one sleeve relative to the other, causing the pins to traverse a substantially helical or screw thread-like path.

A further feature of the invention is that the inner sleeves are composed of more than one part and have the terminal carrying members mounted therein without employment of screws. When couplings are dismantled and reassembsed, it often happens that screws normally holding the parts together are lost, rendering these couplings unusable. This defect is avoided by the invention. In a construction of this type, the inner sleeves are longitudinally split to form two substantially semi-cylindrical halves or sections which are held together by means of a circumferentially located resilient ring or spring element. This makes it very easy to solder the individual ends of the various wires of an electric cord or cable to their respective terminals prior to assembly of the coupling.

This advantage is also obtainable, and assembly of the parts is greatly simplified when the inner sleeves are constituted by a shell-like section having a substantially cylindrical section combined therewith, and when each terminal supporting member is so constructed that upon assembly it substantially fills or completes each shell-like section symmetrically, whereby each shell-like section and its respective terminal supporting member can be easily and releasably held together by means of a surrounding sleeve. This symmetrical construction of the various parts also leads to greater manipulatability of the coupling.

Couplings according to the invention can, furthermore, be constructed with many terminals without becoming too bulky. In a multi-terminal construction for handling a plurality of different line voltages, the spacings between the terminals are usually varied in direct relation to the applied voltages.

These and other objects and advantages of the invention will become further apparent from the following detailed description, reference being made to the accompanying drawings, showing preferred embodiments of the invention.

In the drawings:
Fig. 1 is a sectional view through an assembled coupling embodying the invention;
Fig. 2 shows a partially sectional side view of a plug-like terminal supporting member having blade-like terminals;
Fig. 3 is a view of the member of Fig. 2 taken in the direction of arrow III;
Fig. 4 shows a socket-like terminal supporting member partially in section and illustrating the resilient teeth of the gripping sleeve;
Fig. 5 is a view of the member of Fig. 4 taken in the direction of arrow V;
Fig. 6 is a sectional view through a coupling in assembled relation, illustrating a further embodiment of the invention;
Fig. 7 is a partially exploded view of a terminal supporting member with blade-like terminals and an associated shell-like part, the former being shown in elevation and the latter in section;
Fig. 8 is a view of the structure of Fig. 7 taken in the direction of arrow VIII;
Fig. 9 is a partially exploded, half sectional view of a socket-like terminal supporting member and associated shell-like part;
Fig. 10 is a view of the structure of Fig. 9 taken in the direction of arrow X;
Fig. 11 shows a wave-shaped spring; and
Fig. 12 shows a view similar to Fig. 3 of a modified embodiment of the invention.

Referring now more particularly to the drawings and especially to Figs. 1 to 5, there are provided a pair of terminal carrying bodies such as plug section 1 and socket section 2 which are made, for example, of synthetic plastic or resin. Through slots provided in plug terminal body 1 project the front ends of blade-like contacts or terminals 3, as seen in Fig. 2. Terminals 3 are provided with shoulders 4 with which they abut against corresponding shoulders provided in body 1. In order to prevent undesired displacement of the terminals from body 1, each of the former is secured in the latter by means of a resilient tongue 5 which is stamped or cut out of the rearward end of each terminal 3 so as to lie in locking relationship before the slots when the terminal is inserted into body 1.

At one extremity, terminals 3 are provided with soldering contacts 6. At the front side of body 1 there are provided between the locations of terminals 3 prismatic depressions 7 which enlarge the surface area, i.e., the surface leakage path, between the individual terminals.

Socket terminal body 2 is provided with holes or recesses 8 which are large in cross-section at one side and relatively small at the other side, as shown at 9. Terminals 10 for receiving the terminals 3 are inserted into recesses 8 and present a plurality of resilient tongues or teeth 11. Thus, the teeth of these sleeve-like female terminals grip the blade-like male terminals, rendering the connection extremely safe and secure, even when used on mobile vehicles for long periods of time. Terminals 10 have rearward extensions passing through slots provided for that purpose, which extensions terminate in soldering contacts 12. These extensions are locked against movement through the slots by means of resilient tongues 10′ in the same manner as terminals 3 are held in place by means of tongues 5 in body 1.

Body 1 is mounted between two semi-cylindrical, shell-like members 13 which are held together to form an inner sleeve or tubular member by means of a resilient ring 14 or like connecting element which fits into a peripheral groove provided in the outer surface of said inner sleeve. Correspondingly, body 2 is mounted between two semi-cylindrical shell-like members 15 which together form a second cylindrical inner sleeve and are held together by means of a resilient ring 16. On body 2 an elastic sealing ring 17 is located which may be made of foam or sponge rubber, this ring 17 lying between the end surfaces of inner sleeves 13 and 15.

In at least one of each of the semi-cylindrical shells 13 and 15 there is provided a longitudinal rib or ledge (not shown) on which bodies 1 and 2, respectively, are seated by means of grooves 18 and 19, respectively. Likewise, in one of each of the semi-cylindrical shells 13 and 15, preferably in that one which does not contain the above mentioned rib, there is provided a collar 20 connected to the shell, as by riveting, by means of extensions 21, to which collar 20 a cable screening member can be soldered.

To the extent that body 2 projects from inner sleeve 15 and into inner sleeve 13, its location is determined by interengagement between the rib formed in shell 13 and groove 19 in body 2, this rib, of course, being the one which engages groove 18 in body 1. By means of the angular position of grooves 18 and 19, respectively, relative to the terminals, the coupling elements can be so guided or oriented that only such elements can be coupled in which the relationship between the terminals and the grooves is the same. In place of groove 18, other corresponding grooves, such as those designated by 18b, 18c and 18d in Fig. 3, can be provided. A terminal body 2 having a groove 19 then cannot be coupled any more with the first mentioned body 1. Only another body 2, which is provided with other grooves corresponding to one or more of grooves 18b, 18c, 18d in lieu of groove 19 can be employed. Of course, keys or ridges may be employed in lieu of grooves, and either the grooves or the keys may be differentiated from one another by the degree of spacing, dimension, number or orientation, for example.

The unit consisting of shells 13 and body 1 held therein is inserted in an outer sleeve 22 of synthetic material. Sleeve 22 is knurled on its outer surface, as shown at 23. In outer sleeve 22 there is arranged a metallic extension sleeve 24, pressed, for instance, into the synthetic plastic material of sleeve 22. Projections or fingers 25 are cut out of metallic sleeve 24 for a purpose more fully explained below.

The ends of shells 13 passing through outer sleeve 22 are held together, apart from resilient ring 14, by means of a cap 26 having a knurled outer surface 26′ and threaded onto the end of inner sleeve 13. A rubber tube 27 is inserted into cap 26 and is provided at its inner end with an enlarged ring portion surrounded by a metallic ring 28. Between the end of inner sleeve 13 facing rubber tube 27 and the end of said rubber tube there is mounted a compression ring 29.

When cap 26 is threaded onto sleeve 13, ring 29 exerts an axial force on rubber tube 27, causing a radial contraction thereof and creating a watertight seal between tube 27 and the electric cord or cable passing therethrough. The sealing ring does not necessarily have to be integral with sleeve 27, but may consist of a separate element, and tube 27 can be replaced by other suitable means to protect the cord or cable against breakage due to sharp bends, as is described below.

Inner sleeve 15 surrounding body 2 is inserted into an outer sleeve 30, similar to sleeve 22. Sleeve 30 is knurled at 31. Metallic extension sleeve 32 is mounted in outer sleeve 30, which, for example, may also be made of synthetic plastic. Extension sleeve 32 is provided with three locking guide slots 33 in its periphery into which fingers 25 of sleeve 24 fit. As is shown in dotted lines in Fig. 1, these guide slots are curved to provide a helical or screw thread-like path. The inner ends of slots 33 serve as stops or abutments for the respective fingers.

When projections or fingers 25 are inserted into the guide slots 33 and the two outer sleeves are rotated in opposite directions, said outer sleeves approach one another and pull inner sleeves 15 and 13 toward each other due to interaction between projections 25 and guide slots 33. As a result, sealing ring 17 is elastically compressed between sleeves 13 and 15, so that the counter or expanding force of ring 17 due to its resilience maintains projections 25 in the locked position against the inner stop ends of guide slots 33. Projections 25 are so cut from sleeve 24 that they increase in size in a direction opposite to the direction of insertion into slots 33, i.e., they are tapered, the narrower ends facing the slots. Elements 24 and 32, which comprise the bayonet locking means, are preferably constructed of steel, so that they will not be subject to excessive wear and tear even after extensive use. By means of the helical or screw thread-like curvature of the locking slots, the force tending to secure the tongues or projections 25 in the slots is more easily produced.

Referring now to the embodiment illustrated in Figs. 6 to 11, the terminal carrying bodies 41 and 42 are asymmetrically consrtucted. Plug body 41 is provided with centrally located guide or aligning bolt or stud 43 in addition to the blade-like terminals 3, bolt 43 having formed thereon a guide key 43′. Body 41 fits into a sleeve-like member 44, which consists of a shell portion and a cylindrical part 45 connected thereto. Body 41 and member 44 are so constructed that they form a unitary structure when united, and, as shown, this structure is symmetric and cylindrical.

Socket body 42, in which terminals 10 provided with resilient teeth 11 are mounted, fits into a sleeve-like member 50 which is also composed of a shell portion and a cylindrical part 51 connected thereto. To body 42 there is attached a cap 46 which surrounds terminals 10 and which is provided in its front surface with cut-out portions 47 to serve as guides for blade-like terminals 3 to be inserted in the slots of terminals 10. Since terminals 3 are located in surrounding relation to guiding stud or bolt 43, there is provided in the second coupling member a centrally located guide opening 48 to receive bolt 43, opening 48 having a portion of reduced cross section 49 into which guide ledge or key 43′ fits. When placed together, body 42 and member 50 also form a unitary, symmetric and cylindrical structure.

In a manner similar to that indicated for the embodiment of Figs. 1 to 5, the angular position of guide ledge 43' may be varied to produce different coupling relationships between the coupling elements, the effect being similar to that resulting from the provision of grooves 18 to 18d or 19.

The unitary structure consisting of body 41 and member 44 is held together by means of a metallic inner sleeve 52 surrounding same which at the same time serves as a screening member or housing. The unitary structure comprised of body 42 and member 50 is likewise held together by means of a screening, metallic inner sleeve or cap 53. A wave-shaped spring 54 is retained against an annular flange on this cap for a purpose to be described below.

The structure surrounded by sleeve 52 is inserted in an outer sleeve 56, the outer surface of which is knurled at 56'. To the front edge of outer sleeve 56 is attached a steel ring 57, by press fitting or welding, for example, which is provided at three locations spaced 120° from each other with locking guide slots or grooves 58. The structure surrounded by cap 53 is inserted in an outer sleeve 59 which is knurled at 59'. Sleeve 59 is provided with projections 60 which fit into the locking guide slots 58. A shoulder in sleeve 59 serves as an abutment surface for spring 54, so that the latter is elastically deformed when sleeves 56 and 59 are interlocked. Spring 54 thus provides the resilient counter force for maintaining the projections 60 at the inner ends of guide slots 58.

On the outer ends of members 45 and 51 caps 26 knurled at 26' are threaded, as in the first described embodiment of the invention. Sealing rings 61 are inserted into members 45 and 51 and are axially compressed by means of pressure rings 62 threaded into members 45 and 51. Therefore, each ring 61 is radially deformed against the sheath of a cable passing therethrough to surround same in watertight relationship. The cables are protected against breakage by means of coil springs 63 anchored inside caps 26.

Referring more particularly to Fig. 12, it can be seen how a coupling as described above may be constructed with twelve terminals. There are provided accordingly twelve blade-like terminals 3, the spacing of which is correlated to the various circuit voltages to be transmitted thereby. Terminals 3 are located between depressions 7' which enlarge the surface leakage path. Plug body 1' carrying terminals 3 is held between shells 13' and 13" which together form a sleeve. In body 1' there is a groove 18' which cooperates with a rib 34 in shell 13'. Shells 13' and 13" are each provided with offset longitudinal edges which fit together as at 35 in a watertight manner. Apart from elements 34 and 35, the coupling is essentially the same as shown in Figs. 1 to 5. Corresponding to steel ring 24 and projections 25 for the bayonet locking means are ring 24' and projections 25', respectively.

Equivalent to a bayonet locking type connection between the outer sleeves is a threaded plug connection. Either one of the coupling members can also be constructed as a flanged box. In the event that the metallic sleeve-like parts are not to be subjected to unduly great stresses, in which case it would not be necessary to construct them from steel, they may be cast from aluminum or aluminum alloys and electrolytically oxidized to present an insulating coating on their inner surfaces and to be surface hardened. Thus, even if exposed sections of the soldered wires were to come in contact with the inner surfaces of such sleeves, no short circuit would occur.

In retrospect, therefore, it may be seen that, in its broadest aspects, the coupling according to the invention comprises the combination of socket means, plug means engageable with said socket means, said socket means and said plug means being adapted to be respectively connected to portions of conductors to be coupled, with manipulating means respectively connected to said socket means and said plug means, and resilient means operatively mounted with respect to said manipulating means, said manipulating means including means engageable with one another to maintain said manipulating means in one position in which said socket means and said plug means are coupled together, said engageable means being under the action of said resilient means in said one position to prevent uncoupling and accidental disengagement of said plug means from said socket means.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A coupling for electric cords, cables, and like conductors; comprising first and second terminal supporting means facing one another, a first group of terminals mounted in said first terminal supporting means, a second group of terminals mounted in said second terminal supporting means, each terminal of said second group of terminals being constructed to complement a respective terminal of said first group of terminals, each terminal being provided with contact means to which a portion of a conductor may be connected, first and second inner sleeves surrounding said first and said second terminal supporting means, respectively, engageable means on each of said first and second terminal supporting means and on each of said first and second inner sleeves, respectively, to prevent relative rotation between each of said terminal supporting means and its respective inner sleeve, first and second outer sleeves made of synthetic plastic material and rotatably surrounding said first and said second inner sleeves, respectively, first and second metallic extension sleeves fixedly mounted on the adjacent ends of and coaxially with said first and said second outer sleeves, respectively, said second extension sleeve being provided with a plurality of substantially helical guide slots in its periphery, said first extension sleeve being provided with a corresponding plurality of fingers to slide in said slots, said fingers and said slots constituting bayonet locking means and being operable to move said outer sleeves toward one another, means within each of said outer sleeves and engageable with said inner sleeves to move the latter together with said terminal supporting means toward one another when said fingers are moved into said slots during relative rotation of said first and second outer sleeves, and a resilient ring mounted on said second terminal supporting means and between said first and said second inner sleeves, whereby said resilient ring will be compressed when said inner sleeves approach one another to thereby exert a counter force on said outer sleeves tending to maintain said fingers in said slots in locked position.

2. A coupling according to claim 1, said inner sleeves being threaded at their rearward ends, first and second caps threaded onto said first and said second inner sleeves, respectively, each of said caps being provided with an opening through which a conductor can pass, and rubber tubes supported by said caps and extending through said openings and adapted, respectively, to sheathe said conductors and protect same against breaking.

3. A coupling according to claim 2, each of said rubber tubes being provided with an enlarged end, which ends are clamped between said first cap and said first inner sleeve and between said second cap and said second inner sleeve, respectively, whereby said enlarged ends of said tubes are deformed and pressed against said respective conductors to create tight seals around each of said conductors.

4. A coupling according to claim 2, said first and said second inner sleeves each being constituted by two substantially semi-cylindrical shells, and a resilient ring surrounding each respective pair of shells to hold said shells together.

5. A coupling according to claim 4, said shells being threaded on their rearward ends, first and second caps threaded onto said shells holding the shells of said first and said second inner sleeves together, respectively, each of said caps being provided with an opening through which a conductor can pass, and rubber tubes supported by said caps and extending through said openings and adapted, respectively, to sheathe said conductors and protect same against breaking.

References Cited in the file of this patent

UNITED STATES PATENTS

| | | |
|---|---|---|
| 1,978,510 | Spence | Oct. 30, 1934 |
| 2,135,267 | Alden | Nov. 1, 1938 |
| 2,306,821 | Markey | Dec. 29, 1942 |
| 2,414,106 | Kelley | Jan. 14, 1947 |
| 2,456,572 | Wagstaff | Dec. 14, 1948 |

FOREIGN PATENTS

| | | |
|---|---|---|
| 119,704 | Great Britain | Oct. 11, 1918 |
| 156,450 | Austria | June 26, 1939 |
| 216,786 | Switzerland | Jan. 5, 1942 |
| 442,197 | Great Britain | Feb. 4, 1936 |
| 823,610 | Germany | Dec. 8, 1951 |